(12) United States Patent
Murakami et al.

(10) Patent No.: US 10,916,888 B2
(45) Date of Patent: Feb. 9, 2021

(54) CONNECTOR

(71) Applicant: HITACHI AUTOMOTIVE SYSTEMS, LTD., Hitachinaka (JP)

(72) Inventors: Hiroki Murakami, Atsugi (JP); Kohtaro Shiino, Isehara (JP); Shinichi Isobe, Ebina (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/493,227

(22) PCT Filed: Feb. 16, 2018

(86) PCT No.: PCT/JP2018/005415
§ 371 (c)(1),
(2) Date: Sep. 11, 2019

(87) PCT Pub. No.: WO2018/168317
PCT Pub. Date: Sep. 20, 2018

(65) Prior Publication Data
US 2020/0067233 A1 Feb. 27, 2020

(30) Foreign Application Priority Data
Mar. 14, 2017 (JP) ................................ 2017-048261

(51) Int. Cl.
*H01R 13/639* (2006.01)
*H01R 13/627* (2006.01)
(Continued)

(52) U.S. Cl.
CPC ....... *H01R 13/639* (2013.01); *H01R 13/6272* (2013.01); *H01R 13/641* (2013.01);
(Continued)

(58) Field of Classification Search
CPC .............. H01R 13/6272; H01R 13/641; H01R 13/639; H01R 13/6273; H01R 13/629;
(Continued)

(56) References Cited

U.S. PATENT DOCUMENTS 5,163,848 A * 11/1992 Maeda ................. H01R 13/641
439/354
5,203,719 A * 4/1993 Kozono ............... H01R 13/641
439/489

(Continued)

FOREIGN PATENT DOCUMENTS

| JP | 1990-084279 U | 6/1990 |
| JP | 1992-068379 U | 6/1992 |
| JP | 2016-039011 A | 3/2016 |

OTHER PUBLICATIONS

International Search Report issued in corresponding application No. PCT/JP2018/005415 dated Mar. 27, 2018.
(Continued)

*Primary Examiner* — Edwin A. Leon
*Assistant Examiner* — Matthew T Dzierzynski
(74) *Attorney, Agent, or Firm* — Foley & Lardner LLP

(57) ABSTRACT

An object of the present invention is to provide a connector that restricts a movement amount in a direction of detachment between connectors even when an engagement mechanism between the connectors is disengaged. A connector is configured to be used to electrically connect a first electronic device and a second electronic device to each other. This connector includes a fixation-side connector provided on a first electronic device side and including a tubularly formed insertion portion, an electric wire-side connector connected to the second electronic device via an electric wire and configured to be inserted in the insertion portion of the fixation-side connector, and a restriction portion provided on an opposite side of the electric wire-side connector from an
(Continued)

insertion direction that is a direction in which the electric wire-side connector is inserted into the insertion portion outside the fixation-side connector and the electric wire-side connector. The restriction portion is configured to restrict a movement of the electric wire-side connector from the insertion portion in a direction causing the electric wire-side connector to be detached therefrom.

10 Claims, 4 Drawing Sheets

(51) Int. Cl.
    *H01R 13/641*     (2006.01)
    *B60R 16/023*     (2006.01)
    *H01R 13/66*     (2006.01)

(52) U.S. Cl.
    CPC ........ *B60R 16/023* (2013.01); *H01R 13/6683* (2013.01); *H01R 2201/26* (2013.01)

(58) Field of Classification Search
    CPC . H01R 13/631; H01R 13/635; H01R 13/6456
    See application file for complete search history.

(56) References Cited

U.S. PATENT DOCUMENTS

| | | | | |
|---|---|---|---|---|
| 5,234,356 | A * | 8/1993 | Maejima | H01R 13/6272 439/352 |
| 5,254,014 | A * | 10/1993 | Yagi | H01R 13/6272 439/353 |
| 5,425,650 | A * | 6/1995 | Maeda | H01R 13/631 439/374 |
| 6,116,939 | A * | 9/2000 | Fukuda | H01R 13/6272 439/354 |
| 6,206,717 | B1 * | 3/2001 | Matsumoto | H01R 13/641 439/354 |
| 6,280,226 | B1 * | 8/2001 | Takatsuki | H01R 13/6272 439/354 |
| 6,319,043 | B1 * | 11/2001 | Takatsuki | H01R 13/6272 439/354 |
| 6,325,656 | B1 * | 12/2001 | Fukuda | H01R 13/6272 439/358 |
| 6,341,975 | B1 * | 1/2002 | Takatsuki | H01R 13/6272 439/358 |
| 6,371,796 | B2 * | 4/2002 | Fukuda | H01R 13/641 439/188 |
| 6,428,346 | B1 * | 8/2002 | Torii | H01R 13/641 439/354 |
| 6,435,896 | B1 * | 8/2002 | Takatsuki | H01R 13/6272 439/354 |
| 6,544,066 | B2 * | 4/2003 | Fukase | H01R 13/6272 439/352 |
| 7,033,230 | B2 * | 4/2006 | Horiuchi | H01R 13/6272 439/752 |
| 7,104,829 | B2 * | 9/2006 | Volpone | H01R 13/6272 439/358 |
| 8,777,651 | B2 * | 7/2014 | Miyawaki | H01R 13/6272 439/354 |
| 9,300,088 | B2 * | 3/2016 | Tseng | H01R 13/64 |
| 9,312,635 | B2 * | 4/2016 | Yagi | H01R 13/6272 |
| 9,318,836 | B2 * | 4/2016 | Yagi | H01R 13/6456 |
| 9,368,909 | B2 * | 6/2016 | Yagi | H01R 13/631 |
| 9,859,657 | B2 * | 1/2018 | Endo | H01R 12/707 |
| 10,103,487 | B2 * | 10/2018 | Holub | H01R 13/6272 |

OTHER PUBLICATIONS

Written Opinion issued in corresponding application No. PCT/JP2018/005415 dated Mar. 27, 2018.

* cited by examiner

CONNECTOR

TECHNICAL FIELD

The present invention relates to a connector that provides an electric connection between electronic devices.

BACKGROUND ART

As a commonly-used built-in small connector discussed in PTL 1, only an engagement mechanism between connectors is prepared as a measure for preventing detachment between the connectors.

CITATION LIST

Patent Literature

[PTL 1] Japanese Patent Application Public Disclosure No. 2016-039011

SUMMARY OF INVENTION

Technical Problem

However, the above-described conventional technique may fail to securely prevent the detachment between the connectors. An object of the present invention is to provide a connector that restricts a movement amount in a direction of the detachment between the connectors even when the engagement mechanism between the connectors is disengaged.

Solution to Problem

According to one aspect of the present invention, the present invention provides a connector configured to be used to electrically connect a first electronic device and a second electronic device to each other. This connector includes a fixation-side connector provided on a first electronic device side corresponding to the first electronic device and including a tubularly formed insertion portion, an electric wire-side connector connected to the second electronic device via an electric wire and configured to be inserted in the insertion portion of the fixation-side connector, and a restriction portion provided on an opposite side of the electric wire-side connector from an insertion direction that is a direction in which the electric wire-side connector is inserted into the insertion portion outside the fixation-side connector and the electric wire-side connector. The restriction portion is configured to restrict a movement of the electric wire-side connector from the insertion portion in a direction causing the electric wire-side connector to be detached therefrom. The first electronic device and the second electronic device are electrically connected to each other via the fixation-side connector and the electric-wire side connector with the electric wire-side connector in abutment with the restriction portion.

Therefore, even when the connector is detached, an electric connection can be maintained by restricting the movement amount thereof.

DESCRIPTION OF EMBODIMENTS

First Embodiment

Figure 1:
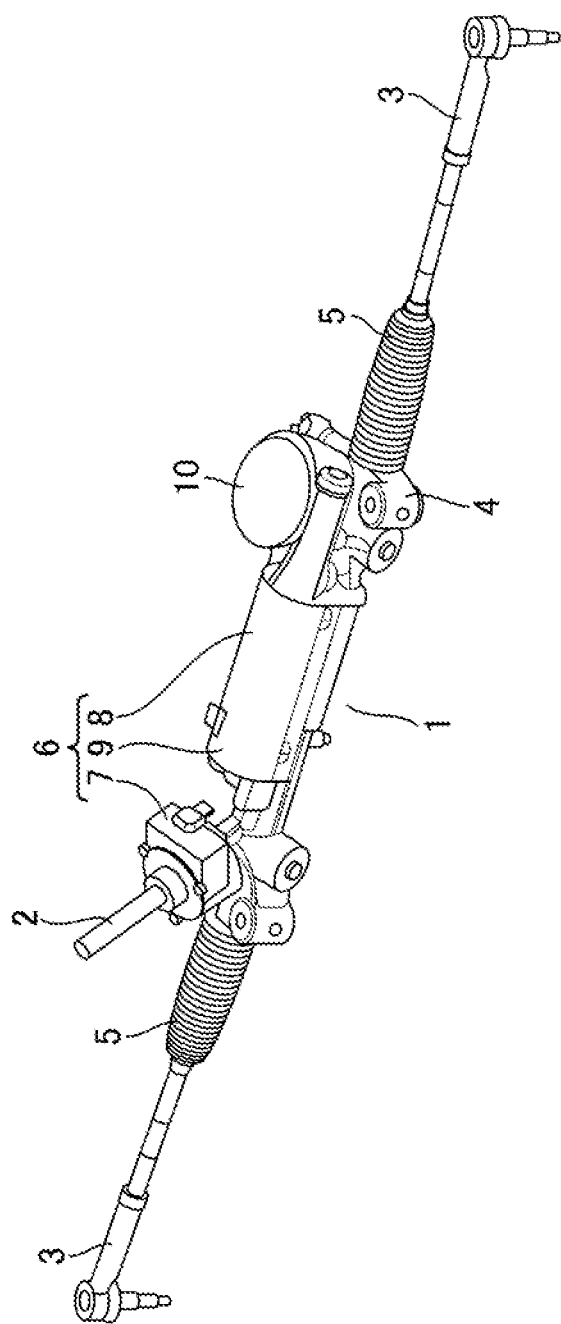
FIG. 1 is an overall perspective view of a steering apparatus as one example to which the present invention is applied.

FIG. 1 is an overall perspective view of a steering apparatus as one example to which the present invention is applied.

First, a steering apparatus for steering front wheels of an automobile will be described. The steering apparatus 1 is configured as illustrated in FIG. 1. A not-illustrated pinion is provided at a lower end of a steering shaft 2 coupled with a not-illustrated steering wheel, and this pinion is meshed with a not-illustrated rack elongated in a lateral direction of a vehicle body. Tie rods 3 for steering the front wheels rightward and leftward are coupled with both ends of this rack, and the rack is covered by a rack housing 4. Then, rubber boots 5 are provided between the rack housing 4 and the tie rods 3.

An electric power steering apparatus 6 is provided to assist a torque when the steering wheel is rotationally operated. More specifically, the electric power steering apparatus 6 is provided with a torque sensor 7, which detects a rotational direction and a rotational torque of the steering shaft 2 and corresponds to a first electronic device, and is further provided with an electric motor portion 8, which applies a steering assist force to the rack via a gear 10 based on a value detected by the torque sensor 7, and an electronic controller portion 9, which controls an electric motor disposed in the electric motor portion 8 and corresponds to a second electronic device. The electric motor portion 8 of the electric power steering apparatus 6 is connected to the gear 10 at three portions on an outer peripheral portion on an output shaft side thereof via not-illustrated bolts, and the electronic controller portion 9 is provided on an opposite side of the electric motor portion 8 from the output shaft.

Figure 2:
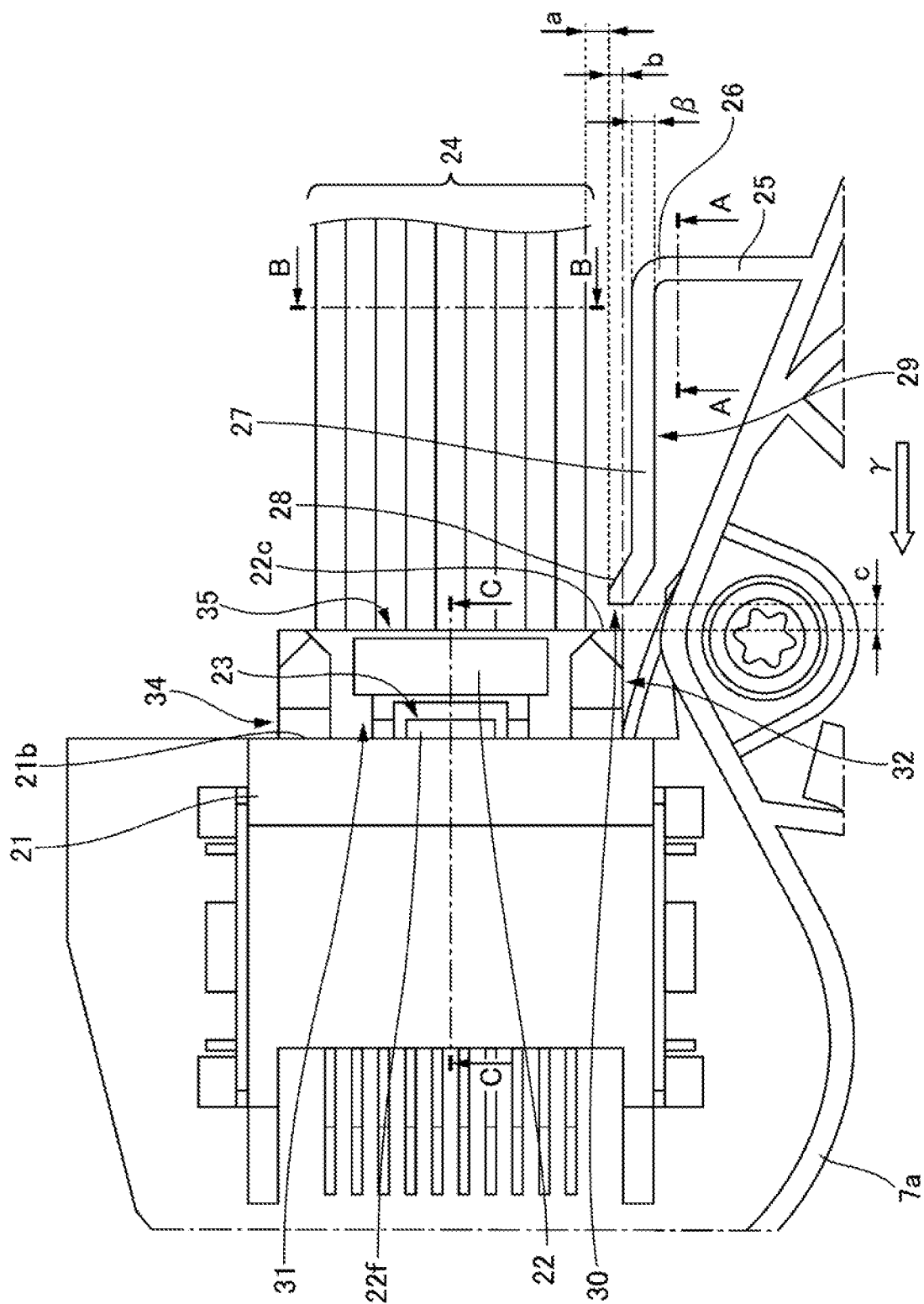
FIG. 2 is an enlarged view of a terminal portion of a torque sensor according to a first embodiment.
Figure 3:
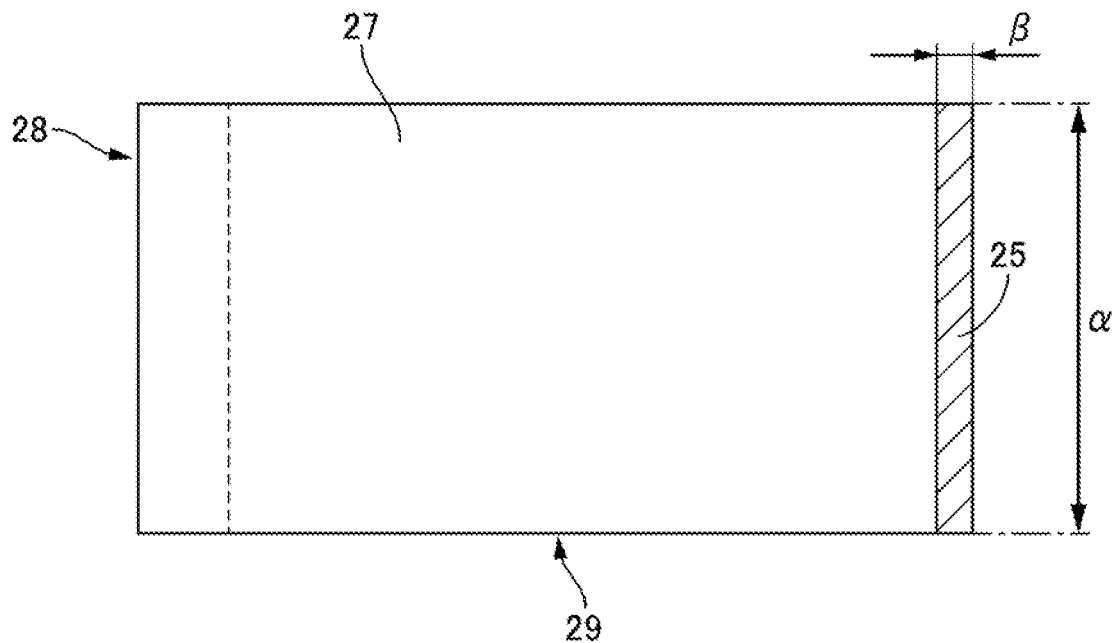
FIG. 3 illustrates a restriction portion according to the first embodiment.
Figure 4:
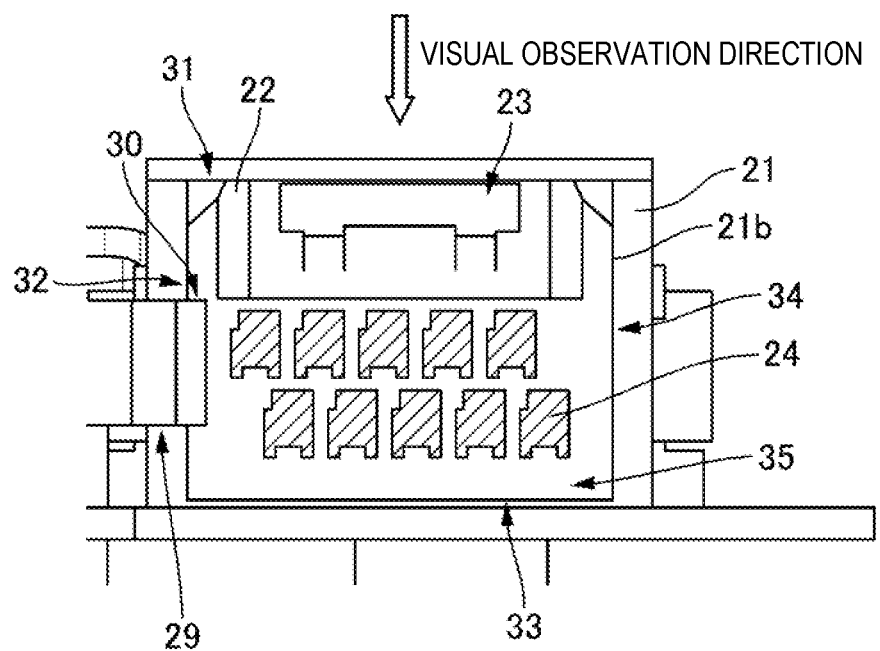
FIG. 4 illustrates a connector as viewed from an insertion direction according to the first embodiment.
Figure 5:
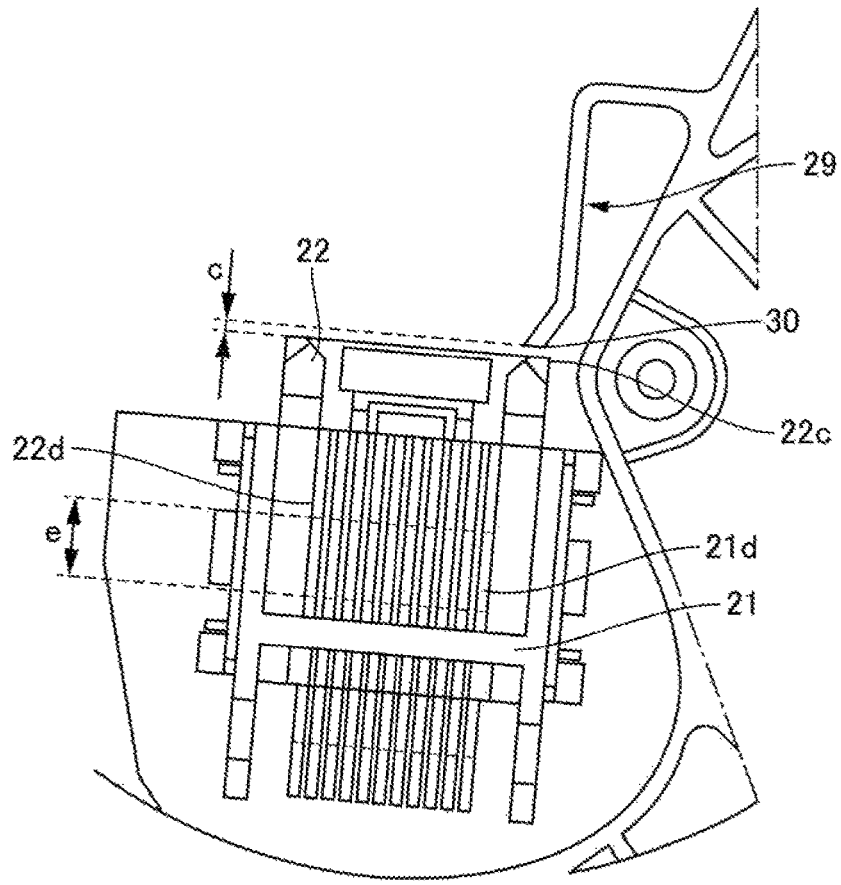
FIG. 5 illustrates a relationship between terminals of both connectors and a relationship between an electric wire-side connector and the restriction portion according to the first embodiment.

FIG. 2 is an enlarged view of a terminal portion of the torque sensor according to a first embodiment. FIG. 3 illustrates a cross section along a line A-A in FIG. 2, and illustrates a restriction portion according to the first embodiment. FIG. 4 illustrates a cross section along a line B-B in FIG. 2, and illustrates a connector as viewed from an insertion direction according to the first embodiment. FIG. 5 illustrates a relationship between terminals of both connectors and a relationship between an electric wire-side connector and the restriction portion according to the first embodiment.

In the following description, a structure of the connector according to the first embodiment will be described with reference to FIGS. 1, 2, 3, 4, and 5.

As illustrated in FIG. 2, a reference numeral 7a indicates a housing of the torque sensor 7. A fixation-side connector 21 includes an electric wire connected to an inside of the resin torque sensor housing 7a, and is fixed to the torque sensor housing 7a. An electric wire-side connector 22 includes an electric wire 24 connected to the electronic controller portion 9, and allows both the connectors 21 and 22 to be electrically connected to each other by being inserted into an insertion hole 21b as an insertion portion of the fixation-side connector 21 from a y direction and being fixedly coupled therewith due to an elastically engaged engagement mechanism 23. Details of the engagement mechanism 23 will be described below. Further, as illustrated in FIG. 4, the electric wire-side connector 22 has a rectangular shape in cross section perpendicular to the insertion direction y in which the electric wire-side connector 22 is inserted into the above-described insertion hole 21b, and includes a first surface 31, a second surface 32, a third surface 33, and a fourth surface 34 around the insertion direction y, and a fifth surface 35 on the insertion direction y side.

Further, as illustrated in FIG. 2, a restriction portion 29 is provided outside the torque sensor housing 7a visibly integrally. The restriction portion 29 includes a base portion 25, a bent portion 26, an arm portion 27, and a tapering portion 28. The arm portion 27 extends toward the insertion direction y, and is formed so as not to overlap the electric wire-side connector 22 in a state inserted in the fixation-side connector 21 as viewed from the insertion direction y. The tapering portion 28 is inclined with respect to an axis along the insertion direction y of the electric wire-side connector 22, and is also formed so as to be gradually separated from the axis along the above-described insertion direction y as the tapering portion 28 is approaching the insertion direction y side. The provision of this tapering portion 28 makes the arm portion 27 easily deflectable, thereby facilitating the insertion when the electric wire-side connector 22 is inserted into the insertion hole 21b of the fixation-side connector 21 in the y direction, because the electric wire-side connector 22 abuts against the tapering portion 28 and a component force in the y direction and a component force for deflecting the arm portion 27 are generated due to the tapering portion 28. Further, a restriction portion-side abutment portion 30, which has a flat surface perpendicular to the insertion direction y, is formed at a free end of this tapering portion 28 closest to the electric wire 24 while being spaced apart from the electric wire 24 by a distance a. This restriction portion-side abutment portion 30 faces an electric wire-side connector abutment portion 22c via a gap c, while having a length b of abutment with the electric wire-side connector abutment portion 22c provided on the fifth surface 35 of the electric wire-side connector 22 on the second surface 32 side with respect to the electric wire 24. As described above, the restriction portion-side abutment portion 30 overlaps the electric wire-side connector 22 to abut against the electric wire-side connector abutment portion 22c in a direction in which the restriction portion-side abutment portion 30 is separated from the electric wire 24 among axes perpendicular to the axis along the insertion direction y, and the arm portion 27 is formed so as not to overlap the electric wire-side connector 22 in the direction in which the restriction portion-side abutment portion 30 is separated from the electric wire 24. Further, this gap c is set to a smaller size than an overlap width e between terminals 21d and 22d of both the connectors 21 and 22 as illustrated in FIG. 5 even if the engagement mechanism 23 is broken and the electric wire-side connector 22 is about to be moved out in an opposite direction from the insertion direction y. Therefore, the electric wire-side connector 22 is prevented from being detached while maintaining the electrically connected state due to the abutment between the restriction portion-side abutment portion 30 of the restriction portion 29 and the electric wire-side connector abutment portion 22c. Further, this gap c can also contribute to preventing or reducing an assembling failure with the engagement mechanism 23 left disengaged, because the restriction portion 29 is out of contact with the electric wire-side connector 22 before a user feels a sensation acquired when the engagement mechanism 23 is engaged, when the electric wire-side connector 22 is inserted manually.

As illustrated in FIG. 3, the base portion 25 of the restriction portion 29 has a long side α that is a length in a vertical direction in the drawing, and a short side β in cross section of the arm portion 27 that is a width in a horizontal direction in the drawing, i.e., a direction in which the base portion 25 extends. The long side α and the short side β are in a relationship of the long side α>the short side β. Therefore, the base portion 25 can counteract bending toward the axis of the base portion 25 along the insertion direction y with the long side α and thus exceed a bending stiffness of the arm portion 27 in the direction perpendicular to the axis along the insertion direction y, thereby facilitating deflection of the arm portion 27 toward the base portion 25 side and improving insertability of the electric wire-side connector 22. Employing such a configuration can also facilitate the deflection of the arm portion 27 even when a hard resin material is used for the resin torque sensor housing 7a required to have a relatively high stiffness.

Figure 6:
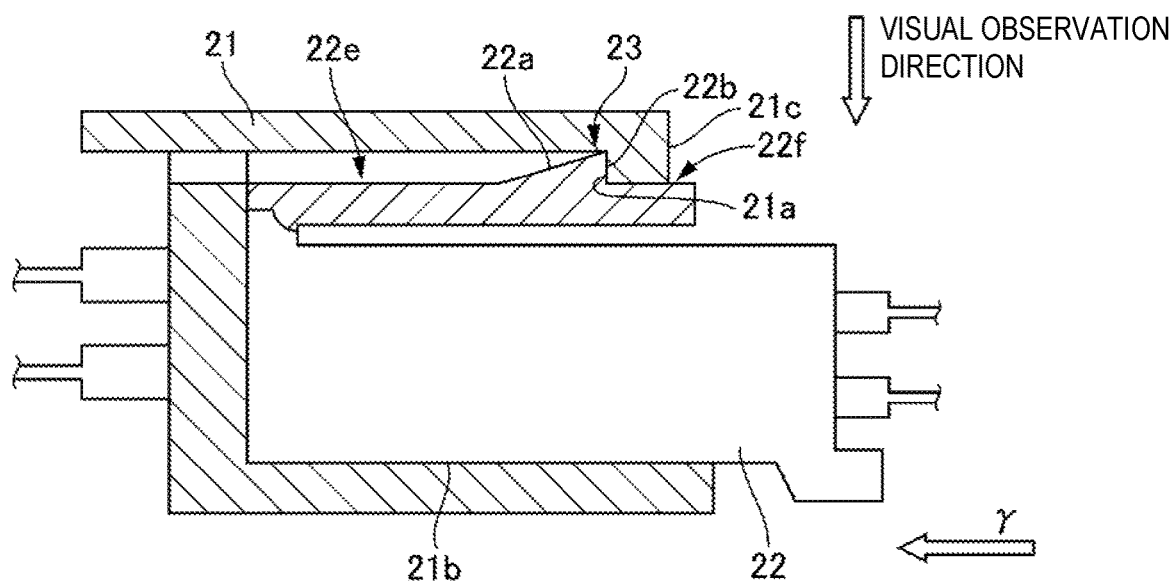
FIG. 6 illustrates an engagement mechanism according to the first embodiment.

FIG. 6 illustrates a cross section along a line C-C in FIG. 2, and illustrates the engagement mechanism according to the first embodiment.

FIG. 6 illustrates the engagement mechanism with the electric wire-side connector 22 inserted in the insertion hole 21b of the fixation-side connector 21 from the y direction and electrically connectably fixed due to the elastically engaged engagement mechanism 23. A tapering portion 22a is formed on an upper surface of the electric wire-side connector 22. The tapering portion 22a is gradually becoming taller toward an opposite side from the insertion direction y. An arm portion 22e is formed on an opposite end surface of the electric wire-side connector 22 from the insertion direction y. The arm portion 22e includes a vertical wall portion 22b extending in a vertical direction in the drawing and elastically deflectable in the vertical direction in the drawing. When the electric wire-side connector 22 is inserted into the insertion hole 21b of the fixation-side connector 21 in the y direction, the tapering portion 22a is brought into abutment with an opening end portion 21c of the fixation-side connector and the arm portion 22e is deflected in a downward direction in the drawing, thereby facilitating smooth insertion. When the electric wire-side connector 22 is inserted by a predetermined distance, the arm portion 22e returns to a normal state and the vertical call portion 22b is engaged with a vertical wall portion 21a of the fixation-side connector 21, by which the electric wire-side connector 22 and the fixation-side connector 21 can be fixed in an electrically connectable state. Further, a part 22f of the engagement mechanism 23 provided on the first surface 31 of the electric wire-side connector 22 is exposed to outside the fixation-side connector 21, and, further, the electric wire-side connector abutment portion 22c placed on the fifth surface 35 as described above is provided on a different surface, by which the engagement state can be confirmed from a visual observation direction, and the restriction portion 29 can also be prevented from blocking the confirmation.

The first embodiment brings about advantageous effects that will be listed now.

(1) The restriction portion is provided outside the fixation-side connector 21 and the electric wire-side connector 22. The restriction portion prevents the detachment of the electric wire-side connector 22 by abutting against the electric wire-side connector 22 while maintaining the electrically connected state between both the connectors 21 and 22. Therefore, the present configuration can prevent or reduce the detachment of the electric wire-side connector 22 while maintaining the electric connection even when the electric wire-side connector 22 is moved in the detachment direction to some extent.

(2) The electric wire-side connector 22 itself is provided with the engagement mechanism 23 that is elastically engaged with the fixation-side connector 21. Therefore, the present configuration can maintain a further secure electric connection. Further, the present configuration can maintain the electric connection due to the restriction portion 29 even when, for example, this engagement mechanism 23 is broken.

(3) The present configuration keeps the restriction portion 29 spaced apart from the electric wire-side connector 22 by the gap c with the fixation-side connector 21 and the electric wire-side connector 22 engaged with each other due to the engagement mechanism 23. Therefore, the present configuration can prevent or reduce occurrence of an internal stress at the restriction portion 29. Further, the present configuration can also prevent or reduce the assembling failure with the engagement mechanism 23 left disengaged, because the restriction portion 29 is out of contact with the electric wire-side connector 22 before the user feels the sensation acquired when the engagement mechanism 23 is engaged, when the electric wire-side connector 22 is inserted manually.

(4) The engagement mechanism 23 is provided in such a manner that the part 22f thereof is exposed to outside, and is also arranged in such a manner that the engagement mechanism 23 and the abutment portion 22c of the electric wire-side connector 22 that abuts against the restriction portion 29 are not provided on the same surface side of the electric wire-side connector 22. Therefore, the present configuration allows the engagement state of the engagement mechanism 23 to be visually confirmed from outside, and also allows the restriction portion 29 to never or less block the confirmation of the engagement state of the engagement mechanism 23.

(5) The bending stiffness of the arm portion 27 of the restriction portion 29 has the lower stiffness than the bending stiffness of the base portion 25. Therefore, the present configuration can improve workability at the time of inserting the electric wire-side connector 22 while bending the arm portion 27. Further, when a force is applied to the electric wire-side connector 22 in the detachment direction, the present configuration can prevent or reduce the deformation of the base portion 25, thereby preventing or reducing the detachment of the electric wire-side connector 22.

(6) The arm portion 27 of the restriction portion 29 is formed so as to extend along the axial direction along the insertion direction y. Therefore, the present configuration can prevent or reduce deformation of the arm portion 27 and thus prevent or reduce the detachment of the electric wire-side connector 22 by reducing a force applied to the arm portion 27 in a bending direction (i.e., replacing it with a force in a compression direction) even when the force is applied in the detachment direction to the easily deflectable arm portion 27 having the low bending stiffness.

(6) The restriction portion 29 is formed so as to have the rectangular shape having the long side and the short side in cross section of the arm portion 27 perpendicular to the insertion direction y of the electric wire-side connector 22, with this short side laid along the direction in which the base portion 25 extends. Therefore, by laying the short side along the direction in which the base portion 25 extends, the present configuration can facilitate the deflection of the arm portion 27 toward the base portion 25 side, thereby improving the insertability of the electric wire-side connector 22.

(7) The restriction portion 29 is molded integrally with the resin torque sensor housing 7a. Therefore, the present configuration eliminates the necessity of additionally providing the restriction portion 29, thereby achieving a reduction in the number of components.

(8) The tapering portion 28 as the inclined surface of the restriction portion 29 is inclined with respect to the axis along the insertion direction y of the electric wire-side connector 22, and is also formed so as to be gradually separated from the axis along the above-described insertion direction y as the tapering portion 28 is approaching the insertion direction y side. Therefore, when the electric wire-side connector 22 abuts against the tapering portion 28, the present configuration can allow the tapering portion 28 to divide a force applied from the electric wire-side connector 22 in the insertion direction y into the component force in the y direction and the component force in the direction for deflecting the arm portion 27 in the bending direction, thereby facilitating the deflection of the arm portion 27 and thus improve the insertability of the electric wire-side connector 22.

(9) The tapering portion 28 as the inclined surface of the restriction portion 29 overlaps the electric wire-side connector 22 in the direction in which the restriction portion-side abutment portion 30 is separated from the electric wire 24 among the axes perpendicular to the axis along the insertion direction y of the electric wire-side connector 22, and the arm portion 27 is formed so as not to overlap the electric wire-side connector 22 in the direction in which the restriction portion-side abutment portion 30 is separated from the electric wire 24. Therefore, the present configuration can reduce an amount by which the arm portion 27 is deflected, thereby preventing or reducing damage on the restriction portion 29, when the electric wire-side connector 22 is inserted.

(10) The arm portion 27, the restriction portion-side abutment portion 30, and the tapering portion 28 of the restriction portion 29 are formed so as to be spaced apart from the electric wire 24 with the electric wire-side connector 22 inserted in the fixation-side connector 21. Therefore, the present configuration can prevent or reduce occurrence of an internal stress in the electric wire 24 and the electric wire-side connector 22.

(11) The restriction portion 29 is provided so as to be able to be confirmed visually from outside the torque sensor 7 with the electric wire-side connector 22 inserted in the fixation-side connector 21. Therefore, the present configuration can allow the state of the restriction portion 29 to be confirmed, for example, visually or with use of a camera after the electric wire-side connector 22 is inserted, thereby improving an assembling quality.

Other Embodiments

Having described the embodiment for implementing the present invention, the specific configuration of the present invention is not limited to the configuration of the embodiment, and the present invention also includes a design modification and the like thereof made within a range that does not depart from the spirit of the present invention. Further, the individual components described in the claims and the specification can be arbitrarily combined or omitted within a range that allows them to remain capable of achieving at least a part of the above-described objects or producing at least a part of the above-described advantageous effects.

The present application claims priority under the Paris Convention to Japanese Patent Application No. 2017-48261 filed on Mar. 14, 2017. The entire disclosure of Japanese Patent Application No. 2017-48261 filed on Mar. 14, 2017 including the specification, the claims, the drawings, and the abstract is incorporated herein by reference in its entirety.

REFERENCE SIGNS LIST 7 torque sensor (first electronic device)
7a torque sensor housing
9 electronic controller portion (second electronic device)
21 fixation-side connector
22 electric wire-side connector
29 restriction portion
23 engagement mechanism
25 base portion
26 bent portion
27 arm portion
28 tapering portion (inclined surface)
a distance
b abutment length
c gap
α long side
β short side

The invention claimed is:

1. A connector configured to be used to electrically connect a first electronic device and a second electronic device to each other, the connector comprising:
a fixation-side connector provided on a first electronic device side corresponding to the first electronic device, the fixation-side connector including a tubularly formed insertion portion;
an electric wire-side connector connected to the second electronic device via electric wire, the electric wire-side connector being configured to be inserted in the insertion portion of the fixation-side connector; and
a restriction portion provided on an opposite side of the electric wire-side connector from an insertion direction that is a direction in which the electric wire-side connector is inserted into the insertion portion outside the fixation-side connector and the electric wire-side connector, the restriction portion being configured to restrict movement of the electric wire-side connector from the insertion portion in a direction causing the electric wire-side connector to be detached therefrom, wherein
the first electronic device and the second electronic device are electrically connected to each other via the fixation-side connector and the electric-wire side connector with the electric wire-side connector in abutment with the restriction portion,
the electric wire-side connector includes an engagement mechanism elastically engaged with the fixation-side connector,
the restriction portion is configured to be spaced apart from the electric wire-side connector with the fixation-side connector and the electric wire-side connector engaged with each other due to the engagement mechanism, and
the restriction portion includes a base portion provided at the first electronic device, and an arm portion connected to the base portion via a bent portion and extending in the insertion direction.

2. The connector according to claim 1, wherein the electric wire-side connector has a rectangular shape in cross section perpendicular to the insertion direction,
wherein the electric wire-side connector includes a first surface, a second surface, a third surface, and a fourth surface around the insertion direction,
wherein the electric wire-side connector includes a fifth surface including an electric wire-side connector abutment portion configured to abut against the restriction portion,
wherein the engagement mechanism is provided on the first surface,
wherein the engagement mechanism is disposed in such a manner that at least a part of the engagement mechanism is exposed to outside the fixation-side connector with the electric wire-side connector inserted in the insertion portion, and
wherein the abutment portion is provided on the fifth surface closer to a second surface side where the second surface is located than the electric wire is.

3. The connector according to claim 1,
wherein a bending stiffness of the arm portion is lower than a bending stiffness of the base portion.

4. The connector according to claim 1, wherein the arm portion is formed so as to extend along an axis in the insertion direction of the electric wire-side connector.

5. The connector according to claim 1, wherein the arm portion has a rectangular shape having a long side and a short side in cross section perpendicular to the insertion direction, and
wherein the arm portion is formed in such a manner that a direction in which the base portion extends is laid in parallel with the short side.

6. The connector according to claim 1, wherein the first electronic device includes a resin housing, and
wherein the restriction portion is molded integrally with the resin housing.

7. The connector according to claim 1, wherein the restriction portion includes a restriction portion-side abutment portion configured to abut against the electric wire-side connector,
wherein the arm portion includes an inclined surface provided on a restriction portion-side abutment portion side where the restriction portion-side abutment portion is located,
wherein the inclined surface is inclined with respect to the insertion direction, and
wherein the inclined surface is formed so as to be gradually separated from an axis along the insertion direction of the electric wire-side connector as the inclined surface is approaching an insertion direction side where the insertion direction is located.

8. The connector according to claim 7, wherein the inclined surface overlaps the electric wire-side connector in a direction in which the restriction portion-side abutment portion is separated from the electric wire among directions perpendicular to the insertion direction, and
wherein the arm portion is formed so as not to overlap the electric wire-side connector in the direction in which the restriction portion-side abutment portion is separated from the electric wire.

9. The connector according to claim 7, wherein the arm portion, the restriction portion-side abutment portion, and the inclined surface are formed so as to be spaced apart from the electric wire with the electric wire-side connector inserted in the insertion portion.

10. The connector according to claim 1, wherein the restriction portion is visible from outside the first electronic device with the electric wire-side connector inserted in the insertion portion.

* * * * *